(12) United States Patent
Ahrendt

(10) Patent No.: US 6,439,504 B1
(45) Date of Patent: Aug. 27, 2002

(54) SYSTEM AND METHOD FOR SUSTAINING ELECTRIC POWER DURING A MOMENTARY POWER INTERRUPTION IN AN ELECTRIC THRUST REVERSER ACTUATION SYSTEM

(75) Inventor: Terry J. Ahrendt, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/882,905

(22) Filed: Jun. 15, 2001

(51) Int. Cl.$^7$ ................................................. F02K 3/02
(52) U.S. Cl. .................... 244/110 B; 60/230; 60/226.2; 239/265.19
(58) Field of Search ..................... 246/110 B, 213–216, 246/75 R, 58, 60; 318/376, 362, 375, 382; 60/226.2, 230; 239/265.19, 265.25, 265.27, 265.29, 265.31

(56) References Cited

U.S. PATENT DOCUMENTS

| | | |
|---|---|---|
| 1,175,346 A | 3/1916 | Dearborn |
| 2,912,632 A | 11/1959 | Turtil |
| 3,514,952 A | 6/1970 | Schumacher et al. |
| 3,515,361 A | 6/1970 | Blackburn |
| 3,618,880 A | 11/1971 | Hagaman et al. |
| 3,621,763 A | 11/1971 | Geyer |
| 3,714,535 A | 1/1973 | Krivak et al. |
| 3,795,853 A | 3/1974 | Whitehouse |
| 3,815,357 A | 6/1974 | Brennan |
| 3,932,058 A | 1/1976 | Harner et al. |
| 3,936,226 A | 2/1976 | Harner et al. |
| 4,005,822 A | 2/1977 | Timms |
| 4,137,711 A | 2/1979 | Montgomery |
| 4,184,107 A | 1/1980 | Turnini et al. |
| 4,191,094 A | 3/1980 | Flippo |
| 4,284,930 A | 8/1981 | Matty |
| 4,297,844 A | 11/1981 | Halin et al. |
| 4,383,647 A | 5/1983 | Woodruff et al. |
| 4,424,669 A | 1/1984 | Fage |
| 4,437,783 A | 3/1984 | Halin et al. |
| 4,442,928 A | 4/1984 | Eastman |
| 4,458,863 A | 7/1984 | Smith |
| 4,459,121 A | 7/1984 | Gazzera et al. |
| 4,462,207 A | 7/1984 | Hitchcock |
| 4,543,783 A | 10/1985 | Greiine et al. |
| 4,546,783 A | 10/1985 | Lott |
| 4,585,189 A | 4/1986 | Buxton |
| 4,586,329 A | 5/1986 | Carlin |
| 4,607,202 A | 8/1986 | Koenig |
| 4,651,621 A | 3/1987 | Eastman |
| 4,656,407 A | 4/1987 | Burney |
| 4,788,531 A | 11/1988 | Corwin et al. |
| 4,827,248 A | 5/1989 | Crudden et al. |
| 5,167,119 A | 12/1992 | Ward |
| 5,213,286 A | 5/1993 | Elliott, deceased et al. |
| 5,243,817 A | 9/1993 | Matthias |
| 5,267,436 A | 12/1993 | Wood, Jr. et al. |
| 5,282,719 A | 2/1994 | McCarty et al. |
| 5,313,788 A | 5/1994 | Wright et al. |
| 5,327,055 A | 7/1994 | Danielson et al. |
| 5,381,654 A | 1/1995 | Halin |
| 5,448,884 A | 9/1995 | Repp |
| 5,524,431 A | 6/1996 | Brusson et al. |

(List continued on next page.)

Primary Examiner—Galen L. Barefoot
(74) Attorney, Agent, or Firm—Keith A. Newburry, Esq.

(57) ABSTRACT

An electric thrust reverser actuation system includes an electric motors that is controlled to operate in both a motoring mode and a generating mode. During normal actuation system operations, the electric motor is controlled to operate in the motoring mode to move one or more moveable thrust reverser components. During a power interrupt event, in which the motor's primary power source is lost, the motor is controlled to operate in the generating mode. The electrical power generated by the motor during its operation in the generating mode maintains the thrust reverser system locking mechanisms in an energized, unlocked condition, thereby preventing damage to system components.

38 Claims, 6 Drawing Sheets

U.S. PATENT DOCUMENTS

| | | |
|---|---|---|
| 5,550,444 A * | 8/1996 | Zeller .................... 318/139 |
| 5,615,549 A | 4/1997 | Valleroy |
| 5,813,218 A | 9/1998 | Kohlbacher |
| 5,826,823 A | 10/1998 | Lvmons et al. |
| 5,904,041 A | 5/1999 | Dhainault |
| 5,960,626 A | 10/1999 | Baudu et al. |
| 5,996,937 A | 12/1999 | Gonidec et al. |
| 6,009,356 A | 12/1999 | Monroe |
| 6,021,636 A | 2/2000 | Johnson et al. |
| 6,034,492 A | 3/2000 | Saito et al. |
| 6,042,053 A | 3/2000 | Sternberger et al. |
| 6,044,641 A | 4/2000 | Baudu et al. |
| 6,094,908 A | 8/2000 | Baudu et al. |
| 6,121,740 A | 9/2000 | Gale et al. |
| 6,167,694 B1 | 1/2001 | Davies |
| 6,178,867 B1 | 1/2001 | Kovac |
| 6,211,665 B1 | 3/2001 | Ahrendt et al. |
| 6,240,246 B1 | 5/2001 | Evans |
| 6,307,339 B1 | 10/2001 | Yourist et al. |

* cited by examiner

SYSTEM AND METHOD FOR SUSTAINING
ELECTRIC POWER DURING A
MOMENTARY POWER INTERRUPTION IN
AN ELECTRIC THRUST REVERSER
ACTUATION SYSTEM

BACKGROUND OF THE INVENTION

The present invention relates to an electric thrust reverser actuation system and, more particularly, to a system and method for sustaining electrical power during a momentary power interruption in an electric thrust reverser actuation system.

When jet-powered aircraft land, the landing gear brakes and imposed aerodynamic drag loads (e.g., flaps, spoilers, etc.) of the aircraft may not be sufficient to slow the aircraft down in the required amount of distance. Thus, jet engines on most aircraft include thrust reversers to enhance the stopping power of the aircraft. When deployed, thrust reversers redirect the rearward thrust of the jet engine to a forward direction, thus decelerating the aircraft. Because the jet thrust is directed forward, the aircraft will slow down upon landing.

Various thrust reverser designs exist in the art, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. As will be discussed more fully below, each of these designs employs a different type of "moveable thrust reverser component," as that term is defined herein below.

Cascade-type thrust reversers are normally used on high-bypass ratio jet engines. This type of thrust reverser is located at the engine's midsection and, when deployed, exposes and redirects air flow through a plurality of cascade vanes positioned on the outside of the engine. The moveable thrust reverser component in this design may include several translating sleeves or cowls ("transcowls") that are deployed to expose the cascade vanes. Target-type reversers, also referred to as clamshell reversers, are typically used with low-bypass ratio jet engines. Target-type thrust reversers use two doors as the moveable thrust reverser component to block the entire jet thrust coming from the rear of the engine. These doors are mounted on the aft portion of the engine and form the rear part of the engine nacelle. Pivot door thrust reversers may utilize four doors on the engine nacelle as the moveable thrust reverser component. In the deployed position, these doors extend outwardly from the nacelle to redirect the jet thrust.

The primary use of thrust reversers is, as noted above, to enhance the stopping power of the aircraft, thereby shortening the stopping distance during landing. Hence, thrust reversers are primarily deployed during the landing process. More specifically, once the aircraft has touched down, the thrust reversers are deployed to assist in slowing the aircraft. Thereafter, when the thrust reversers are no longer needed, they are returned to their original, stowed position. In the stowed position, one or more stow seals prevent air from flowing through the transcowls or doors, depending on the thrust reverser design. Moreover, stow locks are engaged to prevent unintended deployment of the thrust reversers.

The movement of the moveable thrust reverser components in each of the above-described designs has, in the past, been accomplished via a hydraulic system. Such systems include hydraulic controllers and lines coupled to the aircraft's hydraulic system, hydraulic actuators connected to the moveable components, and hydraulically controlled locking mechanisms. More recently, however, thrust reverser actuation is being controlled by electric (or electromechanical) systems. These systems include one or more electronic controller units that control the operation of one or more electric motors that are coupled to the moveable thrust reverser components via actuators. These systems further include one or more electrically operated locking mechanisms that are operable to lock the moveable components in the stowed position.

As with various other aircraft systems, electric thrust reverser actuation systems are required to withstand certain postulated events without incurring damage to the system. One such event is a postulated power interrupt event that occurs for a specified minimum time period. The specified minimum time period being the maximum design time period required for the system to switch from its primary power source to a secondary power source. Since the locking mechanisms are, for flight safety considerations, designed to be energize-to-release type of locks, if the postulated power interrupt event occurs the locks will be momentarily deenergized and attempt to engage. Thus, if the power interrupt event occurs during movement of the moveable thrust reverser components, potential damage to system components may result.

Hence, there is a need for a system and method for controlling the movement of one or more moveable thrust reverser components that solves one or more of the problems identified above. Namely, a system and method for sustaining electrical power during a postulated momentary power interruption event in an electric thrust reverser actuation system that avoids system damage by maintaining power to the electrically operated locking mechanisms during the power interruption.

SUMMARY OF THE INVENTION

The present invention provides a system and method for controlling an electric thrust reverser actuation system that avoids system damage during a postulated power interrupt event. Specifically, and by the way of example only, the electrical status of a power source that supplies electrical power to an electric motor used to move one or more moveable thrust reverser components is determined by a monitor circuit. The monitor circuit produces a status signal indicative of the power source's electrical status, and a controller circuit, in response to the status signal, controls the electric motor to operate in either a motoring mode or a generating mode. When the electrical status of the power source is "energized," the controller circuit controls the electric motor to operate in the motoring mode. Conversely, when the electrical status is "deenergized," the controller circuit controls the electric motor to operate in the generating mode.

In one aspect of the present invention, a system for controlling the movement of a thrust reverser includes an electric motor, one or more actuators, a monitor circuit, and a controller circuit. The electric motor is coupled to receive electrical power from a power source via one or more supply lines for operating in a motoring mode. The one or more actuators are coupled to the electric motor and are operable to move the thrust reverser between a stowed position and a deployed position in response to rotation of the electric motor. The monitor circuit is coupled to the power source and is operable to produce a status signal indicative of an electrical status thereof. The controller circuit is coupled to receive the status signal from the monitor circuit and is operable, in response thereto, to control the electric motor to operate in a generating mode when the status signal indicates the power source is deenergized, whereby the electric motor supplies electrical power to the one or more supply lines.

In another aspect of the present invention, a method of momentarily sustaining power in one or more supply lines of an electrical thrust reverser system during an interruption of electrical power includes supplying electrical power from a power source, via the one or more supply lines, to an electric motor. The electric motor is coupled to one or more thrust reverser actuators, and is driven by the supply power to operate in a motoring mode. The electrical status of the power source is determined and, when the determined electrical status is that the power source is deenergized, operating the electric motor in a generating mode, whereby the motor supplies electrical power to the one or more supply lines.

DETAILED DESCRIPTION OF THE PREFERRED EMBODIMENTS

Before proceeding with the detailed description of the invention, it is to be appreciated that the present invention is not limited to use in conjunction with a specific thrust reverser system design. Thus, although the present invention is explicitly described as being implemented in a cascade-type thrust reverser system, in which transcowls are used as the moveable thrust reverser component, it will be appreciated that it can be implemented in other thrust reverser system designs.

Figure 1:
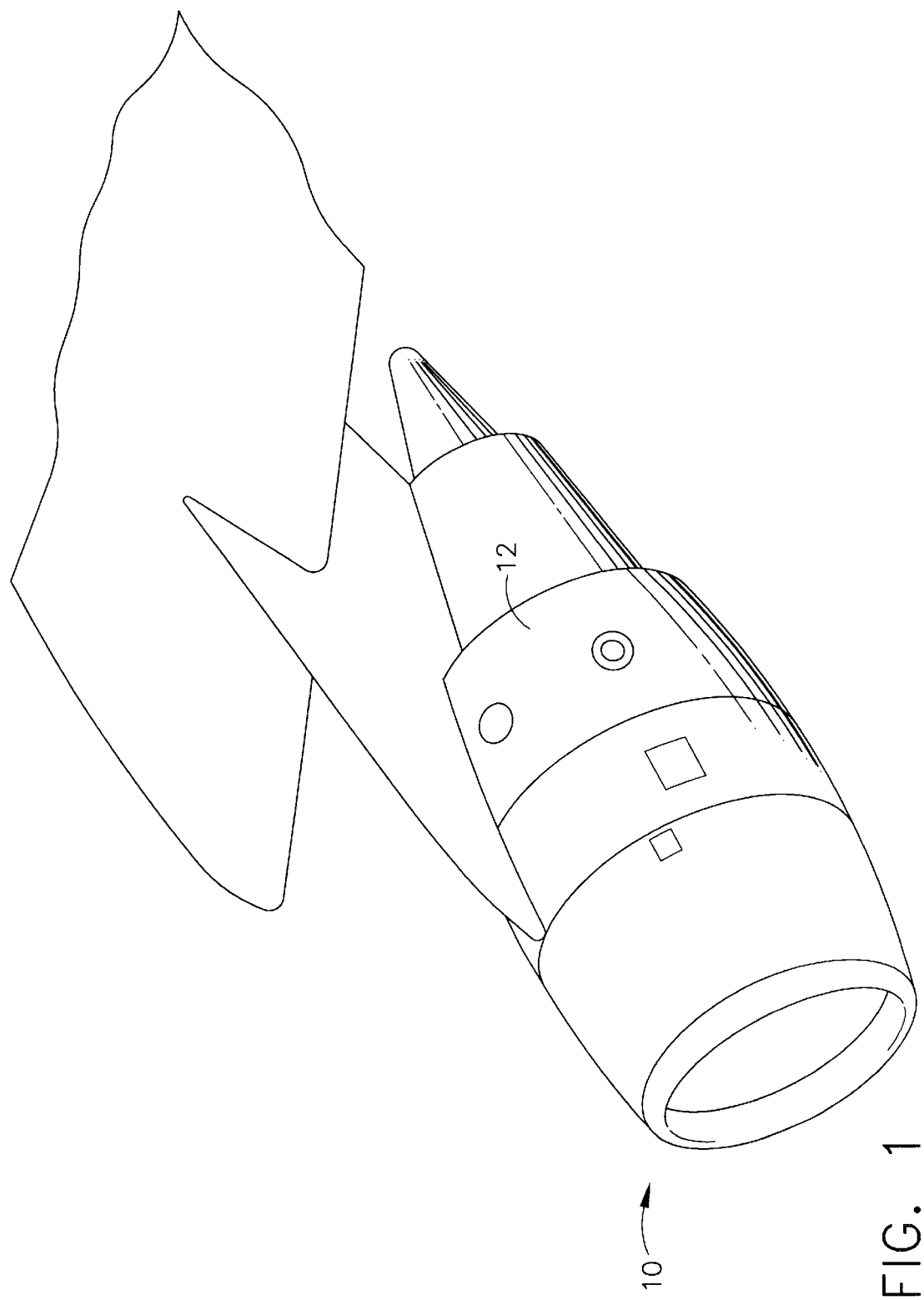
FIG. 1 is a perspective view of an aircraft engine.

Turning now to the description, and with reference first to FIG. 1, a perspective view of portions of an aircraft jet engine fan case 10 that incorporates a cascade-type thrust reverser is depicted. The engine fan case 10 includes a pair of semi-circular transcowls 12 that are positioned circumferentially on the outside of the fan case 10.

Figure 2:
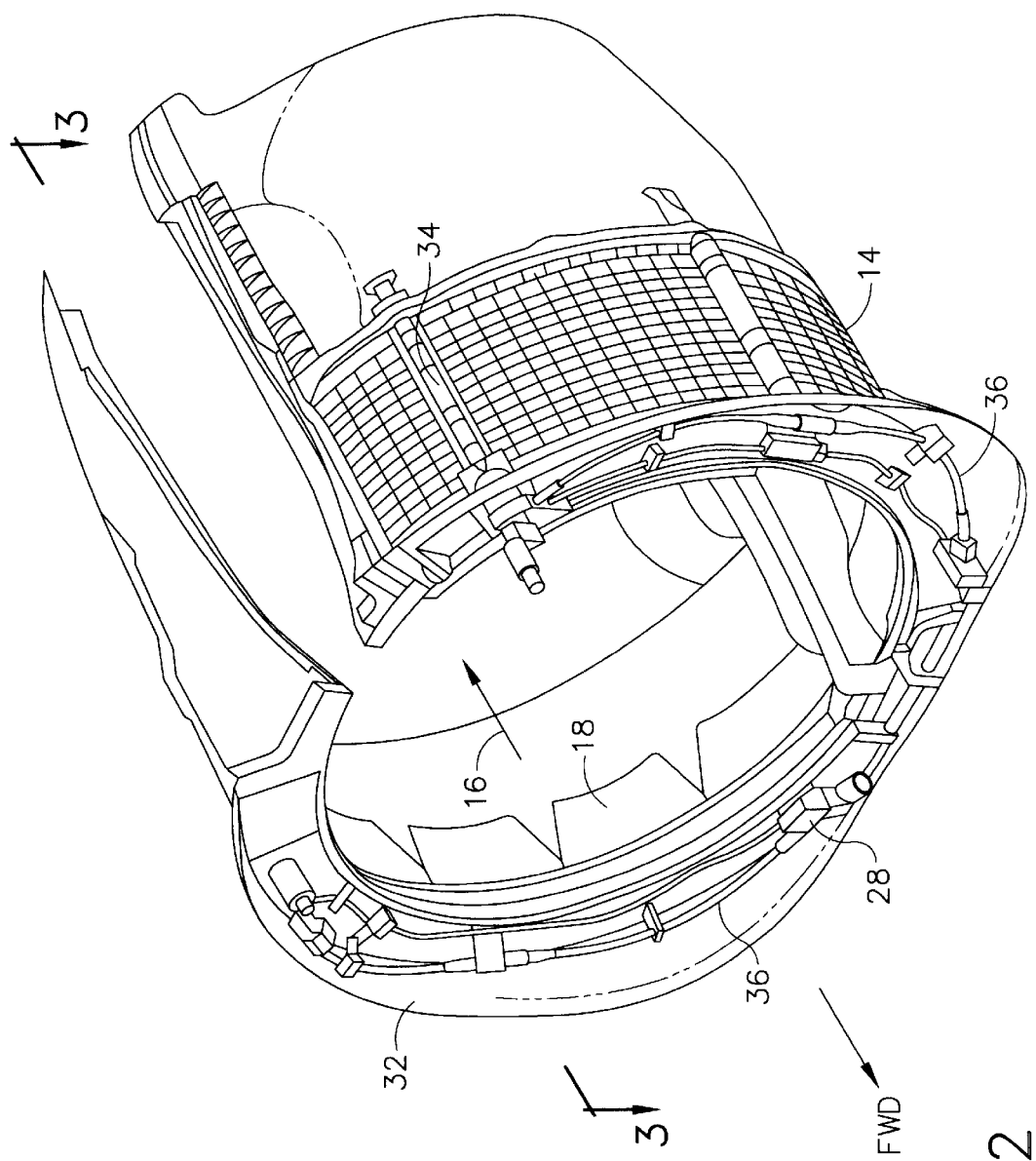
FIG. 2 is a perspective view of portions of an engine fan cowl and thrust reverser system utilized with the engine of FIG. 1.
Figure 3:
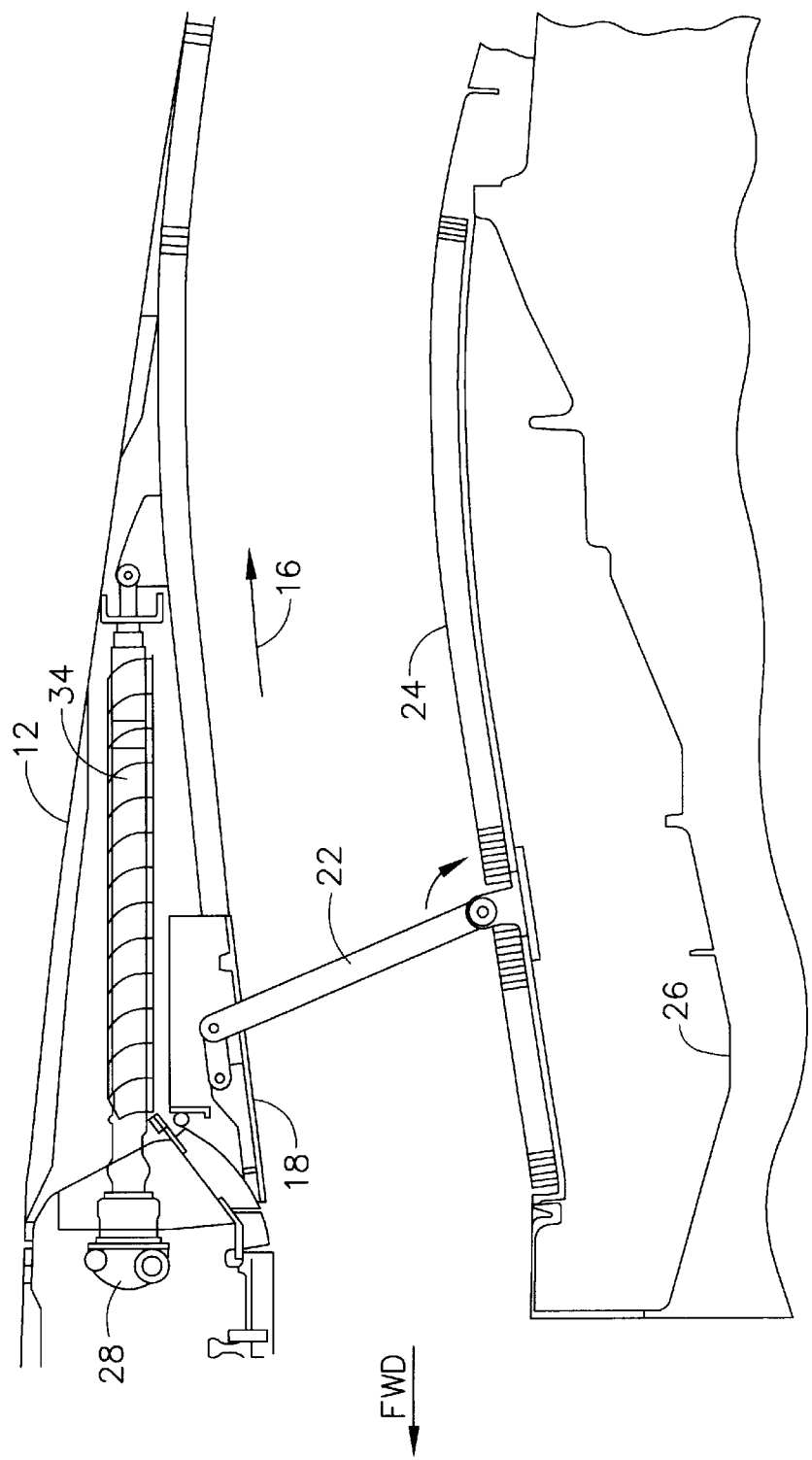
FIG. 3 is a partial cross section view taken along line 3—3 of FIG. 2.

As shown more particularly in FIG. 2, the transcowls 12 cover a plurality of cascade vanes 14, which are positioned between the transcowls 12 and a bypass air flow path 16. A series of blocker doors 18 are each mechanically linked to the transcowls 12 via a drag link 22 that is rotatably connected to an inner wall 24 that surrounds the engine case 26. In the stowed position, the blocker doors 18 form a portion of the inner wall and are therefore oriented parallel to the bypass airflow path 16. When the thrust reversers are commanded to deploy, the transcowls 12 are translated aft, causing the blocker doors 18 to rotate into a deployed position, such that the bypass air flow path 16 is blocked. This also causes the cascade vanes 14 to be exposed and the bypass airflow to be redirected out the cascade vanes 14. The re-direction of the bypass airflow in a forward direction creates a reverse thrust and, thus, works to slow the airplane.

One or more actuators 28 per engine are used to operate the transcowls 12. The actuators 28 are mounted to a stationary torque box 32 and each includes an actuator element 34, such as a ball screw, that is connected to the transcowls 12. The actuators 28 interconnect with each other via a synchronization mechanism, such as a plurality of flexible shafts 36. The flexible shafts 36 ensure that the actuators 28 move at the same rate. Thus, when the actuators 28 rotate, the actuator elements 34 and the connected transcowls 12 translate at the same rate.

Figure 4:
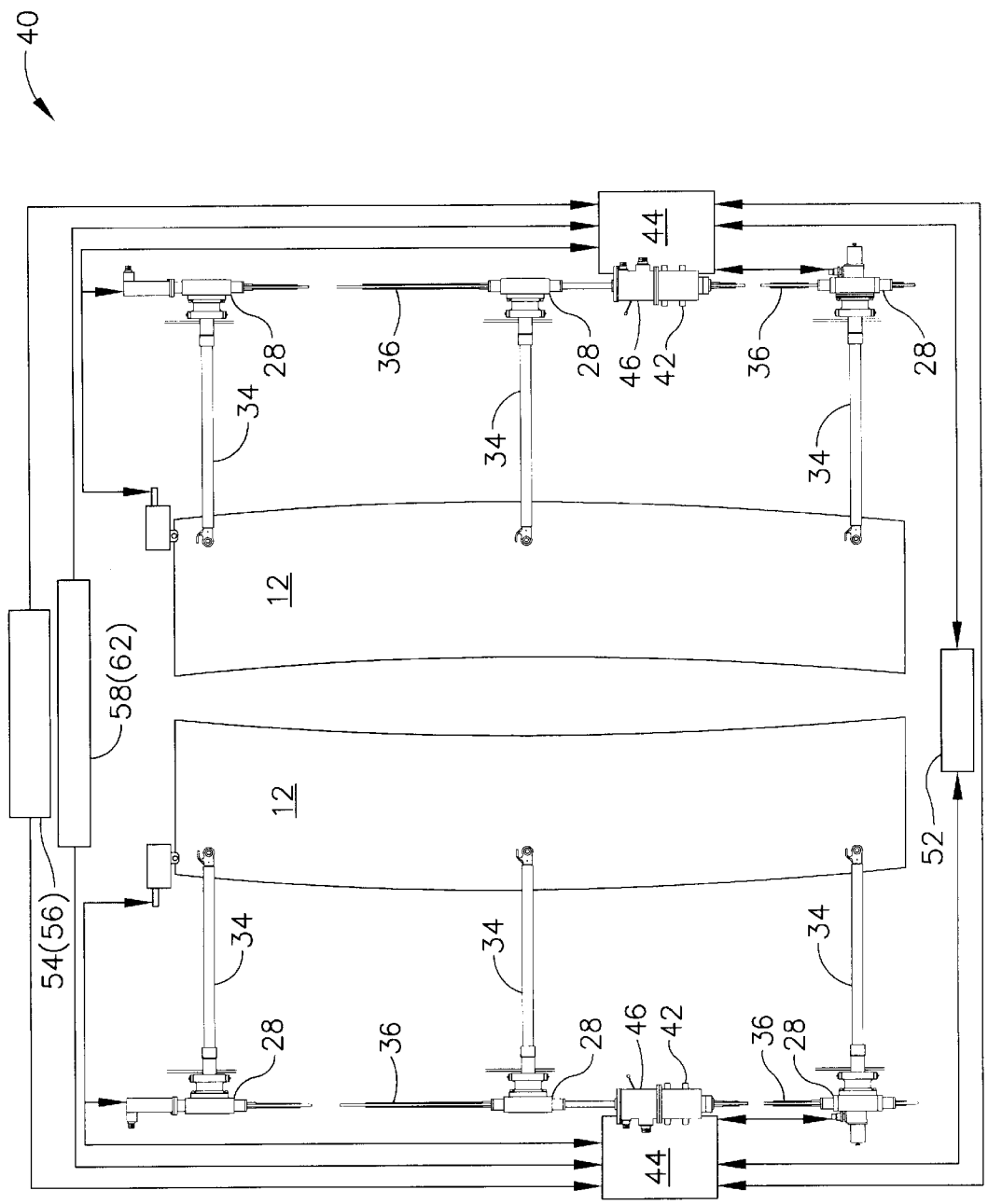
FIG. 4 is a simplified functional schematic representation of an exemplary electric thrust reverser actuation system according to an embodiment of the present invention.

An actuation system controls movement of the transcowls 12 from a locked and stowed position to an unlocked and deployed position for producing reverse thrust, and returns the transcowls 12 from the deployed position back to the stowed and locked position. A simplified functional schematic representation of an exemplary electric thrust reverser actuation system 40 is depicted in FIG. 4. The actuation system 40 includes a plurality of actuators 28, each connected to one of the transcowls 12 by a respective actuator element 34, and interconnected by a plurality of flexible shafts 36. Each of the plurality of actuators 28 is driven by an electric motor 42 that is controlled by a controller unit 44, which will be discussed in more detail below. One or more locking mechanisms. including at least a primary lock 46, prevent unintended movement of the transcowls 12 from the stowed position. Operation of the one or more locking mechanisms 46 is also controlled by the controller unit 44.

The controller unit 44 receives command signals from a main engine controller 52, such as a Fully-Automated Digital Electronic Controller (FADEC), located in the aircraft's cockpit that cause the controller unit 44 to operate the electric motors 42 and locking mechanisms 46. Power to the controller units 44 is provided from redundant AC and DC power sources. Specifically, power to drive each of the electric motors 42 is derived from one of the aircraft's redundant AC power sources 54, 56, and control power for various circuits within the controller unit 44 is derived from redundant DC power sources 58, 62. In a preferred embodiment, each AC power source 54, 56 supplies 3-phase, 115 VAC, and each DC power source 58, 62 supplies 28 VDC. Under normal circumstances the controller units 44 are configured such that both of the controller units 44 are coupled to receive AC power from one of the AC power sources 54 (56) (e.g., the primary AC source) and DC power from one of the DC power sources 58 (62) (e.g., the primary DC source), the other AC 56 (54) and DC 62 (58) power sources (e.g., the backup AC and DC power sources) are available, if necessary, to supply the required power to the controller units 44. Thus, as will be described in more detail below, should the primary AC power source 54 (56) fail, the system 40 will automatically provide AC power to both controller units 44 from the operable backup AC power source 56 (54). Similarly, should the primary DC power source 58 (62) fail, the system will automatically provide DC power to both controller units 44 from the operable backup DC power source 62 (58). It should be noted that both the AC power sources 54, 56 and the DC power sources 58, 62, as defined herein, include not only the originating source of the AC or DC power, but the various electrical busses that couple the AC and DC power sources to the controller unit 44. It should additionally be appreciated that either of the AC power sources 54, 56 or either of the DC power sources 58, 62 could be used as the primary power source and the other as the backup power source. The skilled artisan will also appreciate that the present invention encompasses a split power supply configuration. That is, a configuration in which one of the controller units is coupled to receive AC power from one of the AC power sources 54 (56) and DC power from one of the DC power sources 58 (60), and the other controller unit is coupled to receive AC and DC power from the other AC 56 (54) and DC 62 (58) power sources, respectively.

Figure 5:
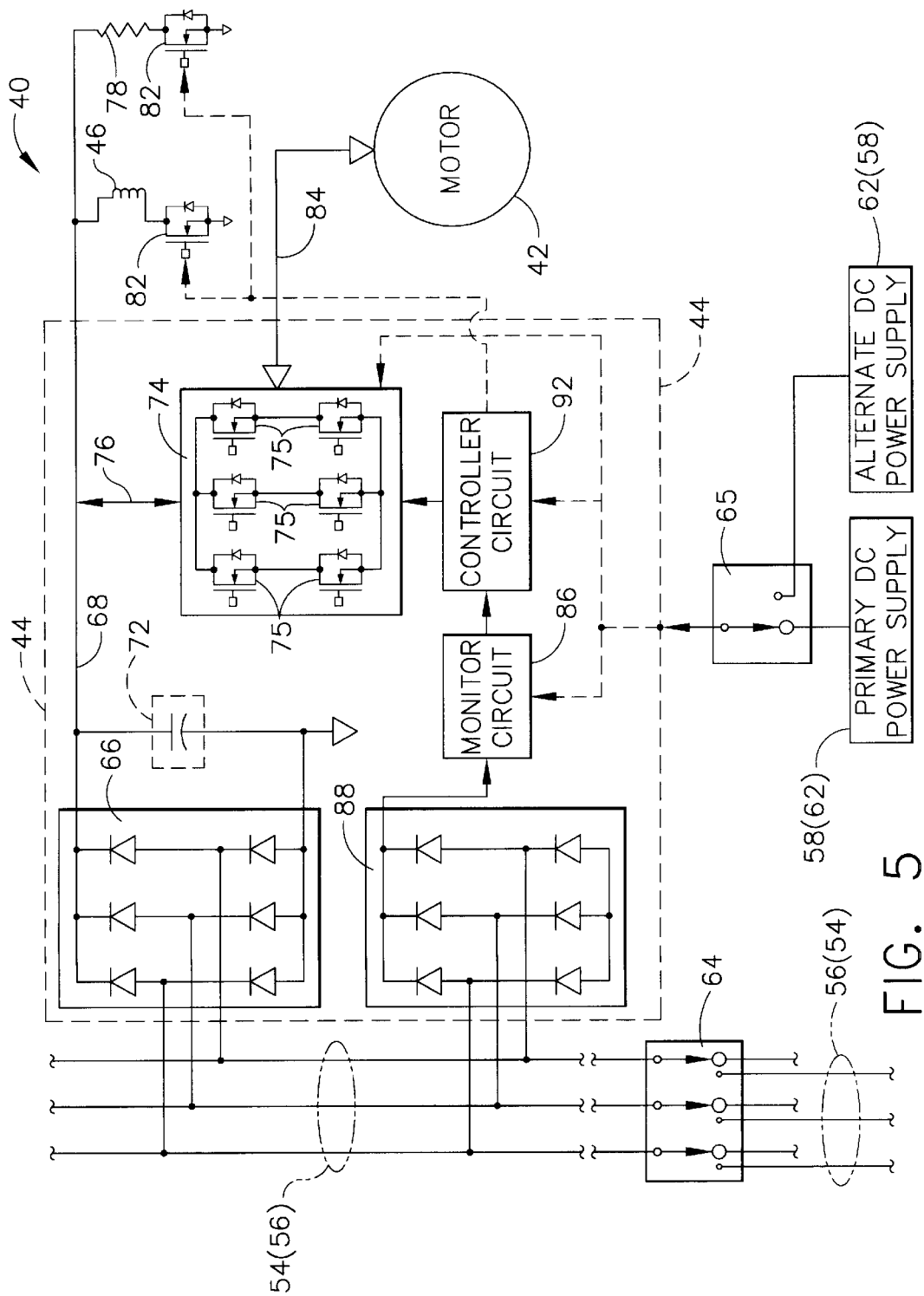
FIG. 5 is a simplified schematic representation of the electric thrust reverser actuation system depicted in FIG. 4, including a functional schematic block diagram of a portion of the controller unit.

With reference now to FIG. 5, which depicts a simplified schematic representation of portions of the electric thrust reverser actuation system 40, along with a functional schematic block diagram of a portion of the controller unit 44 according to a preferred embodiment, a discussion of the present invention will now be provided. However, before proceeding with the discussion, it is to be appreciated that the controller unit 44, as depicted in FIG. 5 and described herein below, may include various other circuit portions not explicitly depicted and described. The present discussion of the controller unit 44 pertains only to those circuit portions used to implement the present invention, and other circuit portions or features that may be included in the controller unit 44, but which are not necessary to understand or implement the present invention, are not depicted and described.

Turning now to the detailed description of the controller unit 44, it can be seen that each controller unit 44 is coupled to receive AC power from one of the AC power sources 54 (56) and DC power from one of the DC power sources 58 (62). Should the AC power source 54 (56) fail, a switching device 64, which may be one of numerous devices known in the art, switches the controller unit 44 to receive AC power from the other AC power source 56 (54), thus reenergizing the AC power source 54 (56) to the controller unit 44. Similarly, if the DC power source 58 (62) fails, the controller unit 44 is automatically switched to receive DC power from the other DC power source 62 (58). The mechanism for switching the DC power sources is depicted as being a switching device 65 similar to the switching device 64 used to switch the AC power sources, but could be one of numerous mechanisms known in the art.

Internally, the controller unit 44 includes a first rectification circuit 66 coupled to receive the 3-phase AC voltage from the AC power source 54 (56) and rectify it into a DC voltage. The DC voltage from the first rectification circuit 66 is coupled to other circuitry and components both internal and external to the controller unit 44 via one or more supply lines 68. It is to be appreciated that, while only a single line 68 is depicted schematically, this single supply line could comprise a plurality of lines, as is known in the art. The circuits and components internally coupled to the supply line 68 include a capacitance element 72, the purpose of which will be discussed further below, and an inverter circuit 74. The inverter circuit 74 is depicted as being coupled to the supply line 68 via a two-way inverter supply line 76. This is because, as will be discussed below, DC power is not only supplied from the supply line 68 to the inverter circuit 74 via the inverter supply line 76, but is also supplied, under certain circumstances, from the inverter circuit 74 to the supply line 68 via the inverter supply line 76. The inverter circuit 74 is electrically coupled to the motor 42 via three motor supply lines 84. Again, the motor supply line 84 is depicted as providing two-way power flow since, as will be discussed below, power is not only supplied from the inverter circuit 74 to the motor 42 via the motor supply line 84, but is also supplied, under certain circumstances, from the motor 42 to the inverter circuit 74 via the motor supply line 84. It should be appreciated that the present invention is not limited to a controller unit 44 that includes the inverter circuit 74, but is merely exemplary of a preferred embodiment in which the motor 42 is an AC-powered motor. The skilled artisan will readily appreciate that the present invention encompasses the use of a DC-powered motor as well. In any case, in the preferred embodiment, in which the inverter circuit 74 is included, the inverter circuit 74 preferably comprises a plurality of electronically controlled inverter switching elements 75, which in the depicted embodiment are each MOSFETs (metal oxide field effect transistors). It will be appreciated that other devices known in the art could also be used including, but not limited to, IGBTs (insulated gate bipolar transistors) and BJTs (bipolar junction transistors). The inverter circuit 74 converts the DC voltage from the supply line 68 to an AC voltage having a magnitude and frequency determined by the switching sequence and switching frequency of the inverter switching elements 75. The operation of such inverters is known in that art and a detailed discussion of this operation will therefore not be provided. It will additionally be appreciated that the inverter circuit 74 may comprise other components and circuitry in addition to the inverter switching elements 75, but illustration thereof is omitted since any one of numerous inverter designs known in the art may be utilized for the inverter circuit 74.

The circuits and components externally coupled to the supply line 68 include the locking mechanism 46, and a load resistor 78. Although the locking mechanism 46 is schematically depicted as being a solenoid-operated type mechanism, it will be appreciated that numerous other electrically operated mechanisms could be utilized to carry out its function. The locking mechanism 46 and the load resistor 78 are each coupled to a reference potential (e.g., circuit ground) via an electronically controlled switch 82, which may also be MOSFETs, IGBTs, or BJTs, similar in design to the inverter switching elements 75. Hence, current flow through the locking mechanism 46 and load resistor 78 is controlled by the status (e.g., conducting or non-conducting) of the individual switches 82.

The controller unit 44 additionally includes a monitor circuit 86 that is operable to produce a status signal indicative of the electrical status of AC power source 54 (56). In a preferred embodiment, the monitor circuit is coupled to the AC power source 54 (56) via a second rectification circuit 88, which provides a DC voltage signal to the monitor circuit 86. It will be appreciated, however, that the inclusion of the second rectification circuit 88 is only exemplary of a preferred embodiment and that the monitor circuit 86 could be designed to be electrically coupled directly to the AC power source 54 (56). As depicted using the dotted lines, operational power for the monitor circuit 86 is provided from a "prime reliable DC power source", which in a preferred embodiment is one of the DC power sources 58 (62).

A controller circuit 92 is coupled to receive the status signal from the monitor circuit 86 and is operable, in response to the status signal, to control the motor 42 either as a motor (e.g., in a "motoring mode") or as a generator (e.g., in a "generating mode"). To implement this dual control, the controller circuit 92, in a preferred embodiment, has access to both a motor control algorithm and a generator control algorithm, which are stored in either unillustrated internal or external memory. More particularly, in a preferred embodiment, in which the motor 42 is an AC-powered motor and the controller unit 44 thus includes the inverter circuit 72, the controller circuit 92, via the appropriate algorithm, controls the switching sequence of the inverter switching elements 75 to operate the motor 42 in either the motoring mode or the generating mode. As with the monitor circuit 86, the controller circuit 92 receives operational power via one of the DC power sources 58 (62) acting as the prime reliable power source.

Generally, the thrust reverser actuation system 40 is commanded to operate by, for example, receiving a command (either a deploy command or a stow command) from the main engine controller 52. Upon receipt of such a command, the controller unit 44 commands the switching element 82 coupled to the locking mechanism 46 to conduct, thereby unlocking the mechanism 46. Substantially simultaneously therewith, or shortly thereafter, the controller circuit 92, via the motor control algorithm, controls the switching sequence of the inverter switching elements 75 to operate the motor 42 in the motoring mode. Rotation of the motor 42 in turn causes rotation of the actuators 28, via the flexshafts 36, and translation of the actuator elements 34 and transcowls 12.

If an event occurs during the movement of the transcowls 12 that results in a loss of the AC power source 54 (56) coupled to the controller units 44, the switching device 64 will automatically couple the controller units 44 to receive AC power from the other source 56 (54). During this short duration switching action, which in a preferred embodiment may last up to approximately 200 milliseconds, AC power to the controller units 44 is lost. Thus, in order to keep the locking mechanism 46 energized and unlocked, to thereby prevent the previously described system damage, the monitor circuit 86 transmits a signal indicative of this AC power loss to the controller circuit 92 as, for example, an interrupt. In response to the received signal, the controller circuit 92 automatically switches from implementing the motor control algorithm to implementing the generator control algorithm. During the short transition between operation in the motoring and generating modes, the capacitance element 72 sustains the DC voltage in the supply line 68. It is noted that if the power generated by the motor 42 while operating in the generating mode exceeds a predetermined limit beyond that which is necessary to maintain the locking mechanism 46 energized, the controller unit 44 commands the switching element 82 that is coupled to the load resistor 78 to conduct. As a result, any excess energy is dissipated in the load resistor 78, and damage to the system is effectively prevented. It is noted that the motive force for rotating the motor 42 during this short duration power interrupt comes solely from the rotational momentum that is residual from its operation in the motoring mode. Since the duration of the power interrupt is relatively short (e.g. ≦200 msec), the rotational speed of the motor 42 will not significantly change. However, if the power interrupt event occurs when the rotational speed of the motor 42 is low, operation in the generating mode could cause the motor 42 to cease its rotation. If this occurs, the motor 42 will not generate any electrical power and, therefore, no energy will be available to keep the locking mechanism 46 released. Nonetheless, since the motors 42, and thus the transcowls 12, are stopped under this circumstance, the lock 46 can engage without any resulting system damage.

Figure 6:
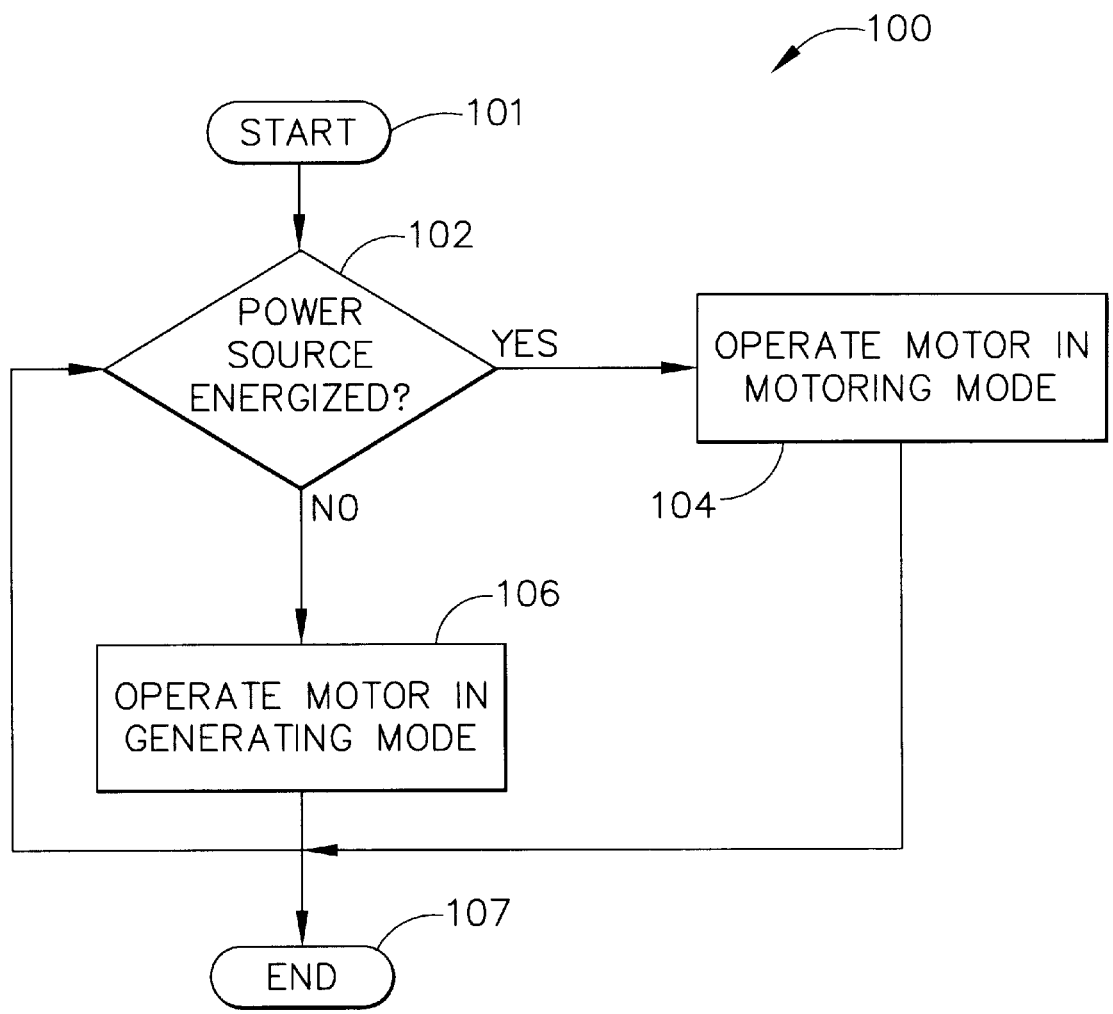
FIG. 6 is a flowchart depicting the method of momentarily sustaining electrical power in the thrust reverser actuation system according to the present invention.

Having described the thrust reverser actuation system 40 specifically from a structural standpoint, and generally from a functional standpoint, a specific description of a preferred embodiment of a method according to the present invention will now be provided. In this regard, reference should now be made to FIGS. 5 and 6 in combination, while a description of a power interruption event is provided. The parenthetical references to "STEPs" correspond to the particular reference numerals of the methodological flow depicted in FIG. 6.

With the above-described background in mind, a description of a preferred methodological process 100 of the present invention will now be provided. Whenever the actuation system 40 is commanded to rotate the motor 42, to either deploy or stow the transcowls 12, the process 100 starts (STEP 101). During the process 100 the monitor circuit 86 continuously determines the electrical status of the power source 54 (56) that is coupled to the controller unit 44 (STEP 102), and provides a signal indicative thereof to the controller circuit 92. If the monitor circuit 86 determines that the power source 54 (56) is energized, then the controller circuit 92 implements the motor control algorithm to thereby control the inverter circuit 74 to cause the motor 42 to operate in the motoring mode (STEP 104). Conversely, if the monitor circuit 86 determines that the power source 54 (56) is deenergized, then the controller circuit 92 implements the generator control algorithm to thereby control the inverter circuit 74 to cause the motor 42 to operate in the generating mode (STEP 106). Specifically, in a preferred embodiment, if the monitor circuit 86 determines that the power source 54 (56) is deenergized by, for example, detecting a loss of voltage from the AC power source 54 (56), it transmits an appropriate signal, such as an interrupt, indicative thereof to the controller circuit 92. In turn, the controller circuit 92, implementing the generator control algorithm, alters the switching sequence of the inverter switching elements 75. As a result, if the motor 42 is rotating, the electrical power generated by the motor's rotation will be supplied to the supply line 68 via the inverter circuit 74. Thereafter, the motor 42 will continue to be operated in the generating mode until the power source 54 (56) is once again energized (STEPs 102, 104), or until the rotation of the motor 42 ceases.

It is to be appreciated that the circuit components of the present invention are not limited to that explicitly depicted herein. Indeed, the circuit components may be formed of either discrete components, or incorporated into a single integrated circuit. Moreover, the process carried out by the electrical components may be realized using software driven devices, or it may be carried out using analog devices and signals, or a combination of both.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A system for controlling the movement of a thrust reverser, comprising:

an electric motor coupled to receive electrical power from a power source via one or more supply lines and being operable to operate in a motoring mode and a generating mode;

one or more moveable actuators coupled to the electric motor and operable to move the thrust reverser between a stowed position and a deployed position in response to rotation of the electric motor;

a monitor circuit coupled to the power source and being operable to produce a status signal indicative of an electrical status thereof; and controller circuit coupled to receive the status signal from the monitor circuit and being operable, in response thereto, to control the electric motor to operate in the generating mode when the status signal indicates the power source is deenergized, whereby the electric motor supplies electrical power to the one or more supply lines.

2. The system of claim 1, wherein the motor controller circuit controls the electric motor to operate in the generating mode until the received status signal indicates the power source is once again energized.

3. The system of claim 1, wherein, while the controller circuit controls the electric motor to operate in the generating mode:

a motive force for rotation of the electric motor comes from rotational momentum that is residual from its operation in the motoring mode; and the electric motor supplies electric power to the one or more supply lines until the rotation substantially ceases.

4. The system of claim 1, wherein the controller circuit is further operable, in response to the received status signal, to control the electric motor to operate in the motoring mode when the status signal indicates the power source is energized.

5. The system of claim 1, further comprising:

one or more electrically powered locking mechanisms coupled to the one or more supply lines.

6. The system of claim 1, further comprising a load resistor coupled between the one or more supply lines and a reference potential.

7. The system of claim 1, wherein the power source comprises an AC power source.

8. The system of claim 7, further comprising:

a first rectification circuit coupled between the power source and the one or more supply lines.

9. The system of claim 8, further comprising:

an inverter circuit coupled to the controller circuit and between the one or more supply lines and the electric motor, wherein the controller circuit controls the inverter circuit to cause the motor to operate in the motoring mode when the status signal indicates the power source is energized and in the generating mode when the status signal indicates the power source is deenergized.

10. The system of claim 7, further comprising:

a capacitance element coupled between the one or more supply lines and a reference potential.

11. The system of claim 7, further comprising:

a second rectification circuit coupled between the AC power source and the monitor circuit.

12. A system for controlling the movement of a thrust reverser, comprising:

an electric motor coupled to receive electrical power from a power source via one or more supply lines, and being operable to operate in a motoring mode and a generating mode;

one or more actuators coupled to the electric motor and operable to move the thrust reverser between a stowed position and a deployed position in response to rotation of the electric motor;

a monitor circuit coupled to the power source and being operable to produce a status signal indicative of an electrical status thereof; and a controller circuit coupled to receive the status signal from the monitor circuit and being operable, in response thereto, to control the electric motor to operate (i) in the motoring mode when the status signal indicates the electric power source is energized and (ii) in the generating mode when the status signal indicates the electric power source is deenergized, whereby the electric motor supplies electrical power to the one or more supply lines.

13. The system of claim 12, wherein, while the controller circuit controls the electric motor to operate in the generating mode:

a motive force for rotation of the electric motor comes from rotational momentum that is residual from its operation in the motoring mode; and the electric motor supplies electric power to the one or more supply lines until the rotation substantially ceases.

14. The system of claim 12, further comprising:

one or more electrically powered locking mechanisms coupled to the one or more supply lines.

15. The system of claim 12, further comprising a load resistor coupled between the one or more supply lines and a reference potential.

16. The system of claim 12, wherein the power source comprises an AC power source.

17. The system of claim 16, further comprising:

a first rectification circuit coupled between the power source and the one or more supply lines.

18. The system of claim 17, further comprising:

an inverter circuit coupled to the controller circuit and between the one or more supply lines and the electric motor, wherein the controller circuit controls the inverter circuit to cause the motor to operate in the motoring mode when the status signal indicates the power source is energized and in the generating mode when the status signal indicates the power source is deenergized.

19. The system of claim 16, further comprising:

a capacitance element coupled between the one or more supply lines and a reference potential.

20. The system of claim 16, further comprising:

a second rectification circuit coupled between the AC power source and the monitor circuit.

21. A system for controlling the movement of a thrust reverser, comprising:

an AC power source;

a first rectification circuit coupled to the AC power source and being operable to provide DC electrical power to one or more supply lines;

an electric motor coupled to receive the DC electrical power from the one or more supply lines and being operable to operate in a motoring mode and a generating mode;

one or more actuators coupled to the electric motor and operable to move the thrust reverser between a stowed position and a deployed position in response to rotation of the electric motor;

a monitor circuit coupled to the AC power source and being operable to produce a status signal indicative of an electrical status thereof, a controller circuit coupled to receive the status signal from the monitor circuit and being operable to provide inverter control signals in response thereto; and an inverter circuit coupled between the one or more supply lines and the electric motor, and additionally coupled to receive the inverter control signals from the controller circuit, wherein the controller circuit, in response to the received status signal, supplies the inverter controls signals to the inverter circuit to cause the electric motor to operate:
  (i) in the motoring mode when the status signal indicates the electric power source is energized; and
  (ii) in the generating mode when the status signal indicates the electric power source is deenergized, whereby the electric motor supplies electrical power to the one or more supply lines.

22. The system of claim 21, wherein, while the inverter circuit controls the electric motor to operate in the generating mode:
  a motive force for rotation of the electric motor comes from rotational momentum that is residual from its operation in the motoring mode; and
  the electric motor supplies electric power to the one or more supply lines until the rotation substantially ceases.

23. The system of claim 21, further comprising:
  one or more electrically powered locking mechanisms coupled to the one or more supply lines.

24. The system of claim 21, further comprising a load resistor coupled between the one or more supply lines and a reference potential.

25. The system of claim 21, further comprising:
  a capacitance element coupled between the one or more supply lines and a reference potential.

26. The system of claim 21, further comprising:
  a second rectification circuit coupled between the AC power source and the monitor circuit.

27. In a thrust reverser system including an electric motor coupled to receive electrical power from a power source via one or more supply lines, and being operable to operate in a motoring mode and a generating mode, and one or more thrust reverser actuators coupled to the electric motor, a method of sustaining electric power in the one or more supply lines during a momentary interruption of the electrical power from the power source, the method comprising:
  supplying the electrical power from the power source, via the one or more supply lines, to operate the electric motor in the motoring mode;
  determining an electrical status of the power source; and
  operating the electric motor in the generating mode when the determined electrical status is that the power source is deenergized, whereby the electric motor supplies electrical power to the one or more supply lines.

28. The method of claim 18, further comprising:
  operating the electric motor in the motoring mode when the determined status is that the power source is energized.

29. The method of claim 27, wherein the electric motor is operated in the generating mode until the determined status is that the power source is once again energized.

30. The method of claim 27, wherein the motive force for rotating the electric motor during its operation in the generating mode comes from rotational momentum that is residual from its operation in the motoring mode.

31. The method of claim 27, further comprising:
  coupling one or more electrically powered locking mechanisms to the one or more supply lines,
  wherein the locking mechanisms remain energized while the electric motor is operating in the generating mode.

32. The method of claim 27, further comprising:
  sustaining a voltage potential in the one or more supply lines, via a capacitance element, during a transition period between the operation of the electric motor in the motoring mode and the generating mode.

33. A method of sustaining electric power during a momentary power interruption in an electrical thrust reverser actuation system, the method comprising:
  coupling an electric motor to receive electrical power to receive electrical power from a power source via one or more supply lines to operate the motor in a motoring mode to operate the thrust reverser actuation system;
  coupling one or more actuators to the electric motor;
  determining a status of the power source;
  operating the electric motor in the motoring mode when the determined status is that the power source is energized; and
  operating the electric motor in a generating mode when the determined status is that the power source is deenergized.

34. The method of claim 33, wherein the electric motor is operated in the generating mode until the determined status is that the power source is once again energized.

35. The method of claim 33, wherein the motive force for rotating the electric motor during its operation in the generating mode comes from rotational momentum that is residual from its operation in the motoring mode.

36. The method of claim 33, further comprising:
  coupling one or more electrically powered locking mechanisms to the one or more supply lines,
  wherein the locking mechanisms remain energized while the electric motor is operating in the generating mode.

37. The method of claim 33, further comprising:
  sustaining a voltage potential in the one or more supply lines, via a capacitance element, during a transition period between the operation of the electric motor in the motoring mode and the generating mode.

38. A method of sustaining electric power during a momentary power interruption in an electrical thrust reverser actuation system, the method comprising:
  coupling an electric motor to receive electrical power to receive electrical power from a power source via one or more supply lines to operate the motor in a motoring mode;
  coupling one or more thrust reverser actuators to the electric motor;
  coupling one or more electrically powered locking mechanisms to the one or more supply lines;
  determining a status of the power source;
  operating the electric motor in the motoring mode when the determined status is that the power source is energized;
  operating the electric motor in a generating mode when the determined status is that the power source is deenergized; and
  sustaining a voltage potential in the one or more supply lines, via a capacitance element, during a transition period between the operation of the electric motor in the motoring mode and in the generating mode,
  wherein the motive force for rotating the electric motor during its operation in the generating mode comes from rotational momentum that is residual from its operation in the motoring mode.

* * * * *